May 25, 1926.
L. F. HUCKER
1,586,152
FRONT RADIUS ROD FOR MOTOR VEHICLES
Filed March 28, 1923
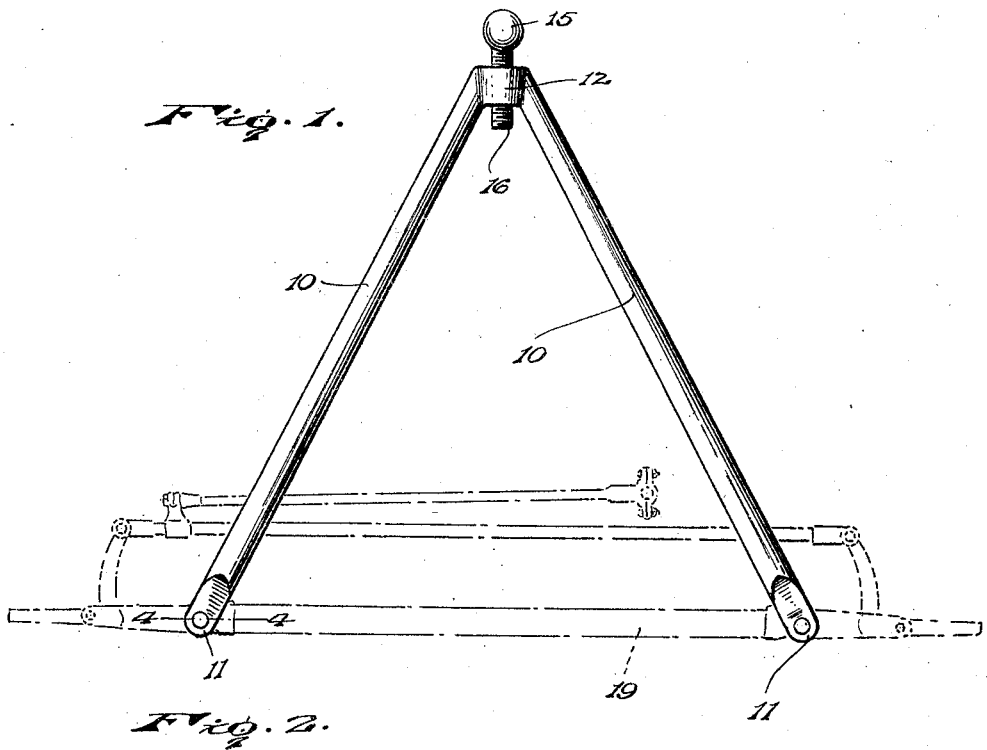
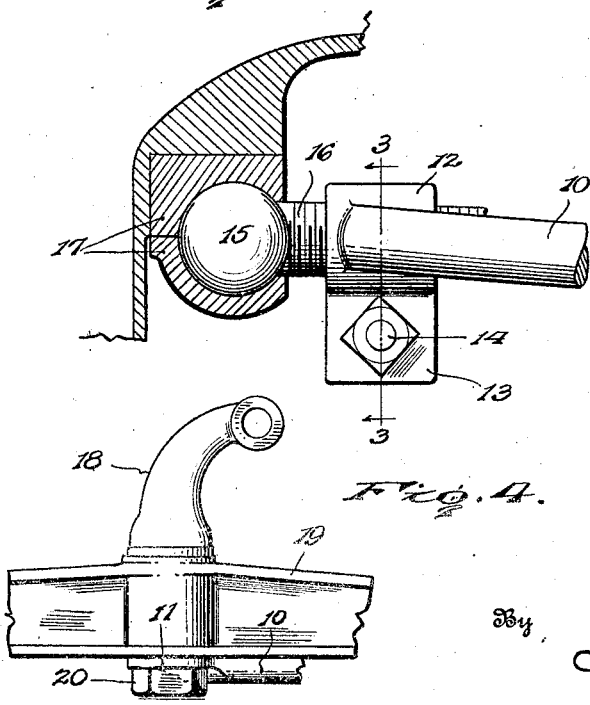
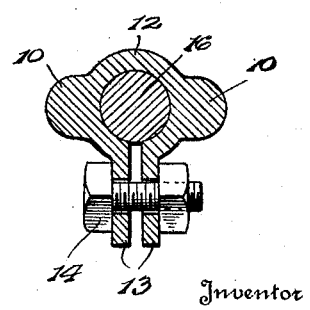
Inventor
L. F. Hucker.
By
Lacy & Lacy, Attorneys Patented May 25, 1926.

1,586,152

UNITED STATES PATENT OFFICE.

LOUIS F. HUCKER, OF HARPER, OREGON.

FRONT RADIUS ROD FOR MOTOR VEHICLES.

Application filed March 28, 1923. Serial No. 628,307.

This invention relates to an improved radius rod for Ford vehicles and seeks, among other objects, to provide a radius rod wherein the effective length of the rod may be adjustably varied for taking up wear at the ball and socket of the rod.

The invention has as a further object to provide a radius rod wherein the ball thereof may be adjusted individually and wherein means will be provided for locking the ball in adjusted position.

And the invention has as a still further object to provide a radius rod which may be readily installed upon Ford vehicles without the necessity for any structural change therein.

Other and incidental objects will appear hereinafter.

Figure 1 is a top plan view showing my improved radius rod in connection with the front axle and associated parts of a Ford vehicle, the axle and said parts being illustrated in dotted lines.

Figure 2 is an enlarged elevation showing the ball at the inner end of the rod and illustrating, in section, the usual socket which accommodates the ball, Figure 3 is a detail sectional view on the line 3—3 of Figure 2, looking in the direction of the arrows, and Figure 4 is a detail elevation showing one of the spring perches of the front axle and illustrating the manner in which the radius rod is connected thereto.

As is well known, considerable wear occurs between the ball of the front radius rod of a Ford vehicle and the ball socket, with the result that the front axle is permitted to tilt rearwardly, cramping the steering gear of the car and often resulting in accident. A like result ensues in any instance wherein a new front spring is installed or shock absorbers are introduced, installation of a front spring or shock absorbers serving to lift the front end of the vehicle frame above its previous position with a consequent shortening in the distance between the radius rod socket and the front axle. Accordingly, the front axle is pulled rearwardly at its lower edge, cramping the steering gear. The present invention, therefore, seeks to provide a radius rod wherein the disadvantages noted may be overcome.

Referring now more particularly to the drawings, it will be seen that my improved radius rod embodies a pair of rearwardly converging arms 10 flattened at their forward ends and provided with eyes 11 while at their rear ends said arms are integrally connected by a head in the nature of a split sleeve 12. Depending from said sleeve are companion ears 13 and extending freely through said ears is a clamping bolt 14. Associated with said sleeve is a ball member including a ball 15 on which is integrally formed a shank or stem 16 screwed through the sleeve. Thus, as will be seen, the ball member may be rotatably adjusted for varying the effective length of the radius rod when, by tightening the bolt 14, the sleeve 12 may be caused to bind against the ball stem locking the ball member in adjusted position.

The ball 15 is, as shown in Figure 2, adapted to fit in the usual split socket 17 at the forward side of the flywheel case of the engine of a Ford vehicle while the eyes 11 of the arms 10 of the radius rod are, as shown in Figure 4, adapted to accommodate the lower ends of the usual spring perches 18 upon the front axle 19 of the vehicle, the usual nuts 20 employed to secure the perches upon the axle also serving to secure the forward ends of the arms. Thus, the radius rod will coact between the socket 17 and the axle for bracing the axle against rearward tilting movement and as wear occurs upon the socket as well as upon the ball 15, the ball member may be adjusted through the sleeve 12 for taking up such wear. Similarly, the ball member may, of course, be likewise adjusted to compensate for any increase in the distance between the front axle and the socket such as would be brought about by the installation of a new front spring or by the installation of shock absorbers, so that the radius rod may be caused to properly function at all times for bracing the front axle. Cramping of the steering gear of the vehicle will accordingly be avoided and, as will be noted, the ball member may be adjusted through the sleeve 12 of the rod without the necessity for removing the ball of said member from the socket therefor. Adjustment of the device may, accordingly, be easily and quickly effected.

Having thus described the invention, what is claimed as new is:

1. In a front radius rod for motor vehicles, the combination of a pair of rearwardly converging arms integrally connected at their rear ends by a sleeve split at its lower side and provided with depending ears, a ball member screwed through the sleeve and adjustable for varying the effective length of the rod, and a bolt extending through said ears and adjustable for contracting the sleeve about said member to lock the ball member in adjusted position as well as clamp said member and prevent stripping of the threads thereof.

2. In a front radius rod for motor vehicles, the combination of companion forwardly diverging arms connected at their rear ends by a split sleeve, a ball member adjustable through the sleeve, and means for contracting the sleeve about said member and locking the member in adjusted position.

3. In a front radius rod for motor vehicles, the combination of companion forwardly diverging arms connected at their rear ends by a contractible sleeve, a ball member adjustable through the sleeve, and means for contracting the sleeve about said member and locking the member in adjusted position.

In testimony whereof I affix my signature.

LOUIS F. HUCKER. [L. S.]